March 14, 1933. G. G. HARRINGTON 1,901,643

DRILL BIT

Filed May 8, 1928

INVENTOR.
George G. Harrington
BY
J. Vincent Martin
ATTORNEY

Patented Mar. 14, 1933

1,901,643

UNITED STATES PATENT OFFICE

GEORGE G. HARRINGTON, OF HOUSTON, TEXAS, ASSIGNOR TO REED ROLLER BIT COMPANY, OF HOUSTON, TEXAS, A CORPORATION OF TEXAS

DRILL BIT

Application filed May 8, 1928. Serial No. 275,997.

This invention relates generally to deep well drilling apparatus and specifically to drill bits.

The type of drill bit now in use, embodying removable cutting blades, is defective because the blades are not rigidly held in the head, and when the bit is subjected to drilling strains, they move in the head to such an extent that their cutting action is seriously impaired.

This invention has for its principal object the provision of means whereby a cutting blade may be rigidly but removably mounted in a head.

Figure 1:
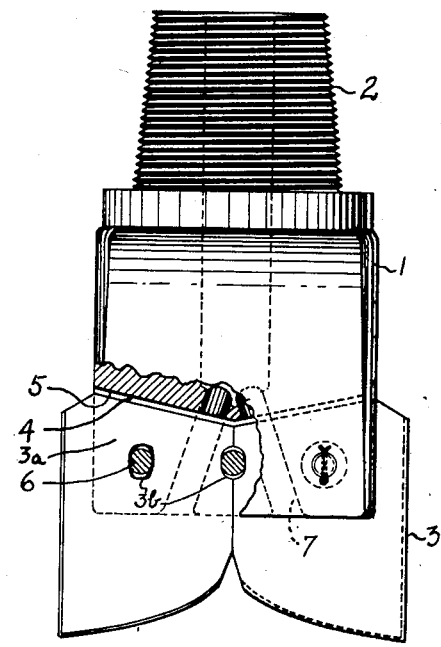
Figure 2:
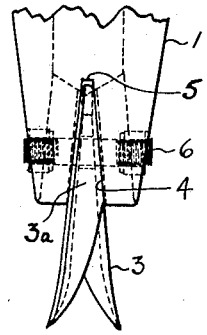
Figure 3:
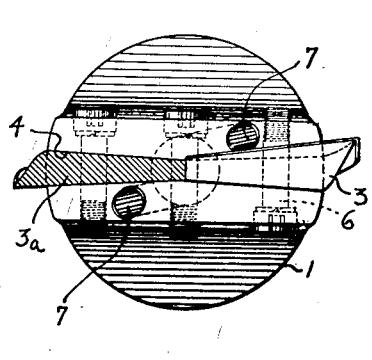
Figure 4:
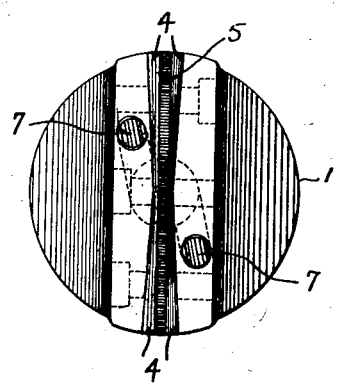

The preferred embodiment of the invention is illustrated in the accompanying drawing, in which Fig. 1 is a partly sectional side elevation of the drill bit; Fig. 2, a fragmentary side elevation at a right angle to Fig. 1; Fig. 3, a partly sectional bottom plan view; and Fig. 4, a bottom plan view of the head with the cutting blade removed.

The bit head is indicated at 1, and has a threaded shank 2 adapted to be screwed into the lowermost section of the drill stem, not shown. In the bottom of the head, a groove is cut for the reception of the upper portion of the cutting blade 3. As shown particularly by Fig. 4, the side walls 4 of this groove are laterally convergent in opposite directions toward the longitudinal axis of the head; and, as shown by Fig. 2, said walls are also convergent upwardly. The upper end of the groove is defined by the substantially V-shaped inner wall 5.

The upper portion 3a of the cutting blade 3 is tapered from its sides inwardly, as shown in section in Fig. 3, and also upwardly as shown by Fig. 2. Its upper edge is also shaped to fit the substantially V-shaped inner wall 5 of the recess. It therefore fits snugly in said groove, wherein it is movably held by suitable bolts 6 extending through the elongated openings 3b.

The head is provided with suitable water courses 7.

When the cutting blade is moved into contact with the bottom of the hole, and made to support a part of the weight of the drill stem, it will move upwardly in the groove in the head and become rigidly locked therein. Such upward movement is permitted by the bolts 6 because of the relative size of the openings 3b.

Practically no strain will be sustained by the bolts 6. After the blade has been so forced up into the head, is cannot move in a lateral or any other direction because of the engagement of its inwardly and upwardly tapered upper portion 3a and the laterally and upwardly convergent walls 4 of the groove.

The construction of the blade is also desirable for the reason that it is enlarged at its side edges, where the greatest strain occurs.

Various embodiments of this invention, other than the preferred embodiment herein described, may be made without departure from the scope of the following claims.

I claim:

1. A drill bit head having a groove extending through the bottom thereof, the side walls of said groove being convergent in opposite directions from the periphery of said head toward the longitudinal axis of said head, and convergent from the bottom of said head toward the bottom of said groove.

2. A drill bit head having a groove extending through the bottom thereof, the side walls of said groove being convergent in opposite directions from the periphery of said head toward the longitudinal axis of said head, and convergent from the bottom of said head toward the bottom wall of said groove, said bottom wall being convergent downwardly and inwardly from the periphery of said head toward the longitudinal axis of said head.

3. A drill bit head having a groove extending through the bottom thereof, the side walls of said groove being convergent in opposite directions from the periphery of said head toward the longitudinal axis of said head, and convergent from the bottom of said head toward the bottom of said groove; and a blade shaped to fit said walls and to extend from opposite sides and the bottom of said head; said blade being gripped by said walls when forced into said groove.

4. A drill bit head having a groove extending through the bottom thereof, the side walls of said groove being convergent in opposite directions from the periphery of said head toward the longitudinal axis of said head, and convergent from the bottom of said head toward the bottom wall of said groove, said bottom wall being convergent downwardly and inwardly from the periphery of said head toward the longitudinal axis of said head; and a blade shaped to fit said walls and to extend from opposite sides and the bottom of said head; said blade being gripped by said walls when forced into said groove.

5. A drill bit head having a groove extending through the bottom thereof, the side walls of said groove being convergent in opposite directions from the periphery of said head toward the longitudinal axis of said head, and convergent from the bottom of said head toward the bottom of said groove; a blade shaped to fit said walls and to extend from opposite sides and the bottom of said head; said blade being gripped by said walls when forced into said groove; and means to hold said blade in said groove so that it may be forced into gripping engagement with said walls.

6. A drill bit head having a groove extending through the bottom thereof, the side walls of said groove being convergent in opposite directions from the periphery of said head toward the longitudinal axis of said head, and convergent from the bottom of said head toward the bottom of said groove; and a blade shaped to fit said walls and to extend from opposite sides and the bottom of said head; said blade being gripped by said walls when forced into said groove; said blade having an opening; and a bolt fitting loosely in said opening to hold said blade in said groove so that said blade may be forced into gripping engagement with said walls.

7. A substantially flat drill blade having side cutting edges, and an upper portion decreasing in thickness from each of said edges toward its axis.

8. A substantially flat drill blade having side cutting edges and an upper portion tapered upwardly and decreasing in thickness from each of said edges toward its axis.

9. A substantially flat drill blade having side cutting edges and an upper portion tapered upwardly and decreasing in thickness from each of said edges toward its axis, the upper edge of said blade being inclined downwardly and inwardly from opposite sides toward the axis of said blade.

In testimony whereof, I hereunto affix my signature.

GEORGE G. HARRINGTON.